United States Patent
Raffy et al.

(10) Patent No.: US 8,551,910 B2
(45) Date of Patent: *Oct. 8, 2013

(54) ALUMINA TITANATE POROUS STRUCTURE

(75) Inventors: Stephane Raffy, Cavaillon (FR); Philippe Auroy, Gif-sur-Yvette (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 273 days.

This patent is subject to a terminal disclaimer.

(21) Appl. No.: 13/002,625

(22) PCT Filed: Jul. 2, 2009

(86) PCT No.: PCT/FR2009/051296
§ 371 (c)(1),
(2), (4) Date: Feb. 23, 2011

(87) PCT Pub. No.: WO2010/001066
PCT Pub. Date: Jan. 7, 2010

(65) Prior Publication Data
US 2011/0152075 A1 Jun. 23, 2011

(30) Foreign Application Priority Data
Jul. 4, 2008 (FR) ...................... 08 54583

(51) Int. Cl.
B01J 23/00 (2006.01)
B01J 21/00 (2006.01)
B01J 32/00 (2006.01)
C04B 35/465 (2006.01)
B01D 50/00 (2006.01)
B01D 53/34 (2006.01)

(52) U.S. Cl.
USPC ........... 502/439; 502/340; 502/341; 502/349; 502/350; 502/351; 502/355; 502/527.19; 501/127; 501/134; 501/135; 501/136; 422/177; 422/180

(58) Field of Classification Search
USPC .............. 502/340, 341, 349, 350, 351, 355, 502/439, 527.19; 501/127, 134, 135, 136; 422/177, 180
See application file for complete search history.

(56) References Cited

U.S. PATENT DOCUMENTS

| 5,344,512 | A  | * | 9/1994  | Colomban et al. | ......... 156/89.26 |
| 5,830,420 | A  | * | 11/1998 | Borowiec et al. | ............... 423/69 |
| 6,531,110 | B1 | * | 3/2003  | Borowiec et al. | ............ 423/610 |
| 7,001,861 | B2 | * | 2/2006  | Beall et al.    | ................... 501/128 |
| 7,166,552 | B2 | * | 1/2007  | Fukuda et al.   | ................ 501/136 |
| 7,405,173 | B2 | * | 7/2008  | Marlin et al.   | ................ 501/105 |
| 7,575,792 | B2 | * | 8/2009  | Fukuda et al.   | ................ 428/116 |
| 7,691,319 | B2 | * | 4/2010  | Inoue           | ............................ 264/630 |
| 7,722,798 | B2 | * | 5/2010  | Takahashi       | ..................... 264/630 |
| RE42,352  | E  | * | 5/2011  | Fukuda et al.   | ................ 501/136 |
| 2003/0040432 | A1 |  | 2/2003 | Beall et al.    |  |
| 2007/0224110 | A1 | * | 9/2007 | Fukuda et al.   | ................ 423/598 |
| 2010/0237007 | A1 | * | 9/2010 | Merkel et al.   | ............. 210/510.1 |

OTHER PUBLICATIONS

U.S. Appl. No. 13/259,273, filed Oct. 3, 2011, Auroy, et al.

International Search Report issued Dec. 22, 2009, in International Patent Application No. PCT/FR2009/051296.

H. Wohlfromm, et al., "Effect of ZrSiO$_4$ and MgO additions on reaction sintering and properties of Al$_2$Tio$_5$-based materials", Journal of Materials Science, vol. 25, No. 8, XP002512515, 1990, pp. 3753-3764.

C. G. Aneziris, et al., "Microsturcture evaluation of Al$_2$O$_3$ ceramics with Mg-PSZ-and TiO$_2$-additions", Journal of European Ceramic Society, vol. 27, No. 10, XP022033420, Apr. 19, 2007, pp. 3193-3199.

Masayuki Ishitsuka, et al., "Synthesis and Thermal Stability of Aluminum Titanate Solid Solutions", Journal of American Ceramic Society, vol. 70, No. 2, XP002512516, 1987, pp. 69-71.

Hans Wohlfromm, et al., "Microstructural Characterization of Aluminum Titanate-based Composite Materials", Journal of European Seramic Society, vol. 7, No. 6, XP0022861914, Jan. 1, 1991, pp. 385-396.

E. Volceanov, et al., "High Thermal Shock Resistant Aluminium Titanate Type Ceramics", Key Engineering Materials, vol. 264-268, XP008089803, Jan. 1, 2004, pp. 993-996.

* cited by examiner

Primary Examiner — Cam N. Nguyen
(74) Attorney, Agent, or Firm — Oblon, Spivak, McClelland, Maier & Neustadt, L.L.P.

(57) ABSTRACT

The invention relates to a porous structure comprising a ceramic material comprising mainly or consisting of an oxide material of the pseudobrookite type comprising titanium, aluminum, magnesium and zirconium in proportions such that the phase of the pseudobrookite type substantially satisfies the formula: $(Al_2TiO_5)_x(MgTi_2O_5)_y(MgTiZrO_5)_z$. This material satisfies the following composition, in mol % on the basis of just the oxides $Al_2O_3$, $TiO_2$, MgO and $ZrO_2$: $90 < 2a + 3m < 110$; $100 + a < 3t < 210 - a$; and $a + t + m + zr = 100$, in which: a is the molar content of $Al_2O_3$; t is the molar content of $TiO_2$; m is the molar content of MgO; and zr is the molar content of $ZrO_2$.

19 Claims, No Drawings

ALUMINA TITANATE POROUS STRUCTURE

The invention relates to a porous structure such as a catalyst support or a particulate filter, the material constituting the filtering and/or active portion of which is based on aluminum titanate. The ceramic material forming the basis of the ceramic filters or supports according to the present invention are predominantly formed from oxides of the elements Al, Ti, Mg and Zr predominantly in the form of a phase of the aluminum titanate $Al_2TiO_5$ (pseudobrookite) type. The porous structures usually have a honeycomb structure and are used especially in an exhaust line of a diesel-type internal combustion engine, the properties of which are improved.

In the remainder of the description, the application and the advantages in the specific field of filters or catalyst supports for removing the pollutants contained in the exhaust gases coming from a gasoline or diesel internal combustion engine, to which field the invention relates, will be described. At the present time, structures for decontaminating exhaust gases all have in general a honeycomb structure.

As is known, during its use, a particulate filter is subjected to a succession of filtration (soot accumulation) and regeneration (soot removal) phases. During filtration phases, the soot particles emitted by the engine are retained and deposited inside the filter. During regeneration phases, the soot particles are burnt off inside the filter, so as to restore the filtration properties thereof. It will therefore be understood that the mechanical strength properties both at low and high temperature of the material constituting the filter are of paramount importance for such an application. Likewise, the material must have a structure which is sufficiently stable to withstand, especially over the entire lifetime of the vehicle fitted therewith, temperatures which may rise locally up to well above 1000° C., especially if some regeneration phases are poorly controlled.

At the present time, filters are mainly made of a porous ceramic material, especially silicon carbide or cordierite. Silicon carbide catalytic filters of this type are for example described in patent applications EP 816 065, EP 1 142 619, EP 1 455 923 or WO 2004/090294 and WO 2004/065088. Such filters make it possible to obtain chemically inert filtering structures of excellent thermal conductivity and having porosity characteristics, particularly average pore size and pore size distribution, which are ideal for the application of filtering soot output by a thermal engine.

However, some drawbacks specific to this material still remain: a first drawback is due to the somewhat high thermal expansion coefficient of SiC, greater than $3 \times 10^{-6}$ $K^{-1}$, which does not permit large monolithic filters to be manufactured and very often requires the filter to be segmented into several honeycomb elements bonded together using a cement, such as that described in patent application EP 1 455 923. A second drawback, of economic nature, is due to the extremely high firing temperature, typically above 2100° C. for sintering, ensuring a sufficient thermomechanical strength of the honeycomb structures, especially during the successive regeneration phases of the filter. Such temperatures require the installation of special equipment, appreciably increasing the cost of the filter finally obtained.

From another standpoint, although cordierite filters have been known and used for a long time, owing to their low cost, it is known at the present time that problems may arise in such structures, especially during poorly controlled regeneration cycles during which the filter may be locally subjected to temperatures above the melting point of cordierite. The consequences of these hot spots may range from a partial loss of efficiency of the filter to its complete destruction in the severest cases. Furthermore, the chemical inertness of cordierite is insufficient at the temperatures reached during the successive regeneration cycles and consequently it is liable to react with and be corroded by the substances originating from the lubricant, fuel, oil and other residues that have accumulated in the structure during the filtration phases, which phenomenon may also be the cause of the rapid deterioration in the properties of the structure.

For example, such drawbacks have been described in the patent application WO 2004/011124 which proposes, to remedy them, a filter based on aluminum titanate (60 to wt %) reinforced with mullite (10 to 40 wt %), the durability of which is improved.

According to another embodiment, patent application EP 1 559 696 proposes the use of powders for the manufacture of honeycomb filters obtained by reactive sintering of aluminum, titanium and magnesium oxides between 1000 and 1700° C. The material obtained after sintering takes the form of a blend of two phases: a predominant phase of the pseudobrookite structural type $Al_2TiO_5$ containing titanium, aluminum and magnesium, and a minor feldspar phase of the $Na_yK_{1-y}AlSi_3O_8$ type.

However, the experiments conducted by the Applicant have shown that it is difficult at the present time to guarantee the performance of such a structure based on a porous material of the aluminum titanate type, in particular to achieve thermal stability, thermal expansion coefficient and corrosion resistance values suitable for example for rendering them able to be directly used in a high-temperature application of the particulate filter type.

In particular, in the particular application of filtering particulates by a material of the oxide group, the corrosion resistance must be controlled so as to prevent the porosity of the filter being modified. More precisely, a strong propensity to corrosion of the material used as constituent of the filter results in a reaction liable to close up the porosity and considerably reduce the filtration capacity and, in the most severe cases, may be the cause of leakage through a filtering wall being punctured.

The object of the present invention is thus to provide a porous structure comprising an oxide material of the pseudobrookite type, having properties, as described above, which are substantially improved, especially so as to make it more advantageous to use them for the manufacture of a filtering and/or catalytic porous structure, typically a honeycomb structure.

More precisely, the present invention relates to a porous structure comprising a ceramic material comprising mainly or consisting of an oxide phase of the pseudobrookite type comprising titanium, aluminum, magnesium and zirconium in proportions such that the phase of the pseudobrookite type substantially satisfies the formula:

said material satisfying the following composition, in mol % on the basis of just the oxides $Al_2O_3$, $TiO_2$, MgO and $ZrO_2$:

$90 < 2a + 3m < 110$;

$100 + a < 3t < 210 - a$;

and $a + t + m + zr = 100$, in which:
a is the molar content of $Al_2O_3$;
t is the molar content of $TiO_2$;
m is the molar content of MgO; and
zr is the molar content of $ZrO_2$.

The expression "on the basis of the oxides" is understood to mean within the present description that the percentage contents (wt % or mol %) are calculated on the basis of the oxides corresponding to the elements present in the ceramic material.

The term "mainly" is understood within the present description to mean that the phase of the pseudobrookite type represents at least 60% and preferably at least 70% or even at least 80% of the total weight of the material.

Preferably, the porous structure consists of said ceramic material.

Preferably, in the above formula, $92 \leq 2a+3m \leq 108$ and very preferably $95 \leq 2a+3m \leq 105$.

Preferably, in the above formula, $100+a \leq 3t \leq 205-a$ and very preferably $100+a \leq 3t \leq 200-a$.

According to one embodiment of the invention, said material has the following composition, in wt % on the basis of the oxides:
more than 25% but less than 55% $Al_2O_3$;
more than 35% but less than 60% $TiO_2$;
more than 1% but less than 8% MgO;
more than 0.7% but less than 7% $ZrO_2$; and
less than 20% $SiO_2$.

Preferably, $Al_2O_3$ represents more than 25% of the chemical composition of the material, the percentage contents being given in wt % on the basis of the oxides corresponding to the elements present. For example, especially for the application of the filter or catalyst support type, $Al_2O_3$ may represent more than 30% and more preferably more than 35% of the chemical composition. Preferably, $Al_2O_3$ represents less than 55% and very preferably less than 50% of the chemical composition, the percentage contents being given by weight on the basis of the oxides.

Preferably, $TiO_2$ represents more than 40% of the chemical composition of the material. Preferably, $TiO_2$ represents less than 60% and very preferably less than 55% of the chemical composition, the percentage content being given by weight on the basis of the oxides.

Preferably, MgO represents more than 1% and very preferably more than 1.5% of the chemical composition of the material. Preferably, MgO represents less than 8% and very preferably less than 6% of the chemical composition, the percentage content being given by weight and on the basis of the oxides.

Preferably, $ZrO_2$ represents more than 0.7% and very preferably more than 1.5% of the chemical composition of the material, the percentage content being given by weight and on the basis of the oxides. Preferably, $ZrO_2$ represents less than 7% and very preferably less than 6% of the chemical composition. Without departing from the scope of the invention, at least some, or even all, of the $ZrO_2$ may be replaced with at least one oxide chosen from the group consisting of $Ce_2O_3$ and $HfO_2$ on the basis of replacing the molar content of the element Zr with the element Ce and/or the element Hf. This is especially the case when the Zr source used has an appreciable proportion of Hf, as is common practice in most commercially available zirconium sources at the present time.

In addition to the contents by weight of all of the oxides present, the structures according to the invention may also contain other minor elements. In particular, the materials may contain silicon in an amount of less than 20%, of preferably less than 10%, on the basis of $SiO_2$. The amount of silicon is preferably greater than 0.5%, advantageously greater than 1% or even greater than 1.5% or indeed greater than 2%. For example, said amount may be between 0.5 and 10% on the basis of $SiO_2$.

The porous structure may also contain other elements such as Ca, Na, K, Fe, Ba and Sr, the total summed amount of said elements present in the material preferably being less than 6% by weight, especially less than 3% by weight and even less than 2% by weight on the basis of the corresponding oxides, in addition to the contents by weight of all the oxides corresponding to the elements present in said material. According to one embodiment, the percentage content of each minor element, on the basis of the weight of the corresponding oxide, is preferably less than 0.7%. According to another embodiment, the percentage content of the elements Ca, Sr and Ba on the basis of the weights of the corresponding oxides is greater than 2%, or even greater than 3% and in particular between 3 and 5%.

So as not to unnecessarily burden the present description, all possible combinations according to the invention between the various preferred embodiments of the compositions of materials according to the invention, as described above, will not be reported. However, of course all possible combinations of the initial and/or preferred values and fields described above may be envisioned and must be considered as described by the Applicant within the context of the present description (especially two, three or more combinations).

The material of the porous structure according to the invention may further include a minor phase consisting of a silicate phase, in proportions that may range from to 40% of the total weight of the material, preferably from 0 to 30% and very preferably from 0 to 25% of the total weight of the material. According to the invention, said silicate phase may consist mainly of silica and alumina. Preferably, the content of silica in the silicate phase is greater than 50% or even greater than 60%.

The material of the porous structure according to the invention may further include a minor phase essentially comprising titanium oxide $TiO_2$ and/or zirconium oxide $ZrO_2$. The expression "essentially comprising" is understood to mean that the content by weight of $TiO_2$ and/or $ZrO_2$ in this phase is around 80% or even at least 90%.

The oxide phase of the pseudobrookite type of the material according to the present invention may approximately satisfy the formula:

$$(Al_2TiO_5)_x(MgTi_2O_5)_y(MgTiZrO_5)_z,$$

in which:
x is between 0.45 and 0.94;
y is between 0.05 and 0.50;
z is between 0.005 and 0.06; and
x+y+z=1.

According to a preferred embodiment, in the above formula:
x is between 0.65 and 0.90;
y is between 0.09 and 0.40;
z is between 0.005 and 0.05; and
x+y+z=1.

The term "substantially" is understood within the present description to mean that the calculated percentage content of each of the oxides corresponding to the elements present in the main phase of the pseudobrookite type, namely (Al, Ti and Mg) departs by no more than 5% and preferably no more than 2% from the percentage content corresponding to the ideal formula $(Al_2TiO_5)_x(MgTi_2O_5)_y(MgTiZrO_5)_z$.

The material constituting the porous structure according to the invention may be obtained by any technique normally used in the field.

For example, the material constituting the structure may be obtained directly, by simply mixing the initial reactants in the appropriate proportions for obtaining the desired composition, followed by forming and sintering. Said reactants may be the simple oxides $Al_2O_3$, $TiO_2$, MgO and $ZrO_2$ and optionally other oxides of elements liable to be in the aluminum titanate pseudobrookite structure, for example in the form of a solid solution, such as silicon.

It is also possible according to the invention to use any precursor of said oxides, for example in the form of carbonates, hydroxides or other organometallics of the above elements. The term "precursor" is understood to mean a material which decomposes into a simple oxide corresponding to a stage often prior to the heat treatment, i.e. at a heating temperature typically below 1000° C., or below 800° C. or even below 500° C.

According to another method of manufacturing the structure according to the invention, the porous structure is obtained from sintered particles of said simple oxides. The blend is presintered, i.e. it is heated to a temperature allowing the simple oxides to react so as to form sintered particles comprising at least one main phase of structure of the pseudobrookite type. It is also possible according to this embodiment to use precursors of said aforementioned oxides. Again, as above, the blend of precursors is sintered, that is to say it is heated to a temperature allowing the precursors to react so as to form particles comprising predominantly at least one phase having a structure of the pseudobrookite type.

According to another possible method of manufacturing the structure according to the invention, the material according to the invention is synthesized from particles obtained by prior melting of the oxides $Al_2O_3$, $TiO_2$, MgO, $ZrO_2$ and optionally $SiO_2$ or other oxides (or the precursors thereof).

For example, the particles are obtained by the fused casting method, which makes it possible to manufacture large quantities with high yields and a very good price/performance ratio.

The successive fused casting steps for the manufacture of the particles are for example as follows:
a) the raw materials are blended so as to form the starting charge;
b) the starting charge is melted so as to obtain molten liquid;
c) said molten liquid is cooled so that the molten liquid has entirely solidified, it being possible for this cooling to take place rapidly, for example in less than 3 minutes; and
d) optionally, said solid mass is milled so as to obtain a particle blend.

In step b), an electric arc furnace is preferably used, but any known furnace can be envisioned, such as an induction furnace or a plasma furnace, provided that it completely melts the starting charge. The firing is preferably carried out under inert conditions, for example under argon, or under oxidizing conditions, preferably at atmospheric pressure.

In step c), the cooling is preferably but not necessarily rapid, i.e. in such a way that the molten liquid becomes entirely solidified in less than 3 minutes. Preferably, the cooling results from casting in CS molds, as described in the patent U.S. Pat. No. 3,993,119, or from a quenching operation.

In step d), the solid mass is milled, using conventional techniques, until the size of the particles allowing manufacture of the present structure is obtained.

One process for manufacturing such a structure according to the invention is in general the following: Firstly, the initial reactants, the particles obtained by sintering or the particles obtained by fused casting, as described above or as a blend thereof, are blended in the appropriate proportions for obtaining the desired composition.

In a manner well known in the field, the manufacturing process typically includes a step of mixing the initial blend of reactants and/or fused-cast and/or sintered particles with an organic binder of the methyl cellulose type and a pore former for example such as: starch, graphite, polyethylene, PMMA, etc. and the progressive addition of water until the plasticity needed to allow the step of extruding the honeycomb structure is obtained.

For example, during the first step, the initial blend is mixed with 1 to 30 wt % of at least one pore-forming agent chosen according to the desired pore size, and then at least one organic plasticizer and/or an organic binder and water are added.

The mixing results in a homogeneous product in the form of a paste. The step of extruding this product through a die of suitable shape makes it possible, using well-known techniques, to obtain honeycomb-shaped monoliths. The process may for example then include a step of drying the monoliths obtained. During the drying step, the green ceramic monoliths obtained are typically dried by microwave drying or by thermal drying, for a time sufficient to bring the non-chemically-bound water content to less than 1 wt %. When it is desired to obtain a particulate filter, the process may further include a step of blocking every other channel at each end of the monolith.

The step of firing the monoliths, the filtering portion of which is based on aluminum titanate, is in principle carried out at a temperature above 1300° C. but not exceeding 1800° C., preferably not exceeding 1750° C. The temperature is adjusted in particular according to the other phases and/or oxides that are present in the porous material. Usually, during the firing step, the monolith structure is heated to a temperature of between 1300° C. and 1600° C. in an atmosphere containing oxygen or an inert gas.

Although one of the advantages of the invention lies in the possibility of obtaining monolithic structures of greatly increased size without the need for segmentation, unlike SiC filters (as described above), according to one possible embodiment, the process may optionally include a step of assembling the monoliths into a filtration structure assembled using well-known techniques, for example those described in patent application EP 816 065.

The filtering structure or structure made of porous ceramic material according to the invention is preferably of the honeycomb type. It has a suitable porosity, generally between 20 and 65%, preferably between 30 and 50%, the average pore size being ideally between 10 and 20 microns. The porous structure according to the invention typically has a honeycomb type structure and can be used as a catalyst support or a filter for automobile applications, the ceramic material constituting said structure having a porosity of greater than 10% and a pore size centered between 5 and 60 microns.

Such filtering structures typically have a central portion comprising a number of adjacent ducts or channels of mutually parallel axes that are separated by walls formed by the porous material.

In a particulate filter, the ducts are closed off by plugs at one or other of their ends so as to define inlet chambers opening onto a gas entry face and outlet chambers opening onto a gas discharge face, in such a way that the gas passes through the porous walls.

The present invention also relates to a filter or to a catalyst support obtained from a structure as defined above and by depositing, preferably by impregnation, at least one active catalytic phase, which is supported or preferably not supported, typically comprising at least one precious metal, such as Pt and/or Rh and/or Pd and optionally an oxide such as $CeO_2$, $ZrO_2$ or $CeO_2$—$ZrO_2$. The catalyst supports also have a honeycomb structure, but the ducts are not closed off by plugs and the catalyst is deposited in the pores of the channels.

The invention and its advantages will be better understood on reading the following non-limiting examples. In the examples, unless otherwise mentioned, all the percentage content are given by weight.

EXAMPLES

In all the examples, the specimens were prepared from the following raw materials:

anatase comprising more than 98% $TiO_2$, sold by the company Altichem or rutile comprising more than 95% $TiO_2$ and having a median diameter $d_{50}$ of about 120 µm, sold by the company Europe Minerals;

alumina AR75 comprising more than 98% $Al_2O_3$, sold by Alcan and having a median diameter $d_{50}$ of about 85 µm;

$SiO_2$ having a purity of greater than 99.5% and a median diameter $d_{50}$ of 208 µm, sold by the company Sifraco;

MgO having a purity of greater than 98% with more than 80% of the particles having a diameter between 0.25 and 1 mm, sold by the company Nedmag;

lime comprising about 97% CaO, with more than 80% of the particles having a diameter of less than 80 µm;

potassium carbonate comprising more than 99.5% $K_2CO_3$, sold by the company Albemarle with more than 80% of the particles having a diameter between 0.25 and 1 mm; and zirconium having a purity of greater than 98.5% and a median diameter $d_{50}$ of 3.5 µm, sold under the reference CC10 by the company Saint-Gobain ZirPro.

The specimens according to the invention and the comparative specimens were obtained from the above reactants, blended in the appropriate proportions and optionally fused-cast and milled.

More precisely, the blends of the initial reactants were premelted in an electric arc furnace, in air in the case of all the examples except for Example 6. The molten blends were then cast into a CS mold so as to be rapidly cooled. They were then milled and screened so as to retain powders with an undersize of 36 µm. These powders were used to produce pressed specimens in the form of disks that were then sintered at a temperature of 1300° C. to 1600° C. for 4 hours. The specimens of materials of the following examples were thus obtained.

In Example 6, the initial reactants were alternatively used directly without prior melting.

The prepared specimens were then analyzed. The results of the analyses carried out on each of the specimens of Examples 1 to 13 are given in Tables 1 and 2.

In Tables 1 and 2:
1) the chemical composition, indicated in wt % on the basis of the oxides, was determined by X-ray fluorescence;
2) the crystalline phases present in the refractory products were characterized by X-ray diffraction and microprobe analysis. In Table 1, AMTZ indicates a solid solution of the $(Al_2TiO_5)_x(MgTi_2O_5)_y(MgTiZrO_5)_z$ type, P2 indicates the presence of a minor secondary phase and PS corresponds to a silicate secondary phase, "M" corresponds to the main phase and "~" means that the phase is present in trace form;
3) the stability of the crystalline phases present was determined by a test consisting in comparing, by X-ray diffraction, the crystalline phases present initially with those present after a heat treatment at 1100° C. for 100 hours. The product was considered to be stable if the maximum intensity of the main peak corresponding to the appearance of rutile $TiO_2$ after this treatment remained 50% below the average of the maximum intensities of the three main peaks of the AMTZ phase. The values given in Table 1 correspond to the percentage ratio of the maximum intensity of the main peak of the rutile phase to the average of the maximum intensities of the three main peaks of the AMTZ phase according to the formula:

$$TiO_2/AMTZ = \frac{\text{Maximum intensity of the main rutile peak}}{\text{Average of the maximum intensities of the 3 largest } AMTZ \text{ peaks}}$$

It is considered that a ratio of less than 50% of the intensities, as described above, characterizes good stability of material and enables it to be used;
4) the thermal expansion coefficient (TEC) corresponds to the average of the values conventionally obtained from 25° C. to 1000° C. by dilatrometry on disks formed from powders having the same particle size distribution, the median diameter $d_{50}$ of which is less than 50 µm. The disks were prepared by pressing and then sintering at the temperature indicated in Table 1; and
5) the module of rupture (MOR) was determined at room temperature in four-point bending in a conventional manner on bars measuring 45 mm×4 mm×3 mm obtained by isostatic pressing followed by sintering of the powders.

TABLE 1

| Example | 1 | 2 | 3 | 4 | 5 | 6 | 7 | 8 | 9 | 10 | 11 | 12 | 13 |
|---|---|---|---|---|---|---|---|---|---|---|---|---|---|
| $Al_2O_3$ | 37.1 | 41.7 | 37.5 | 46.1 | 37.1 | 28.9 | 40.5 | 40.5 | 39.4 | 39.1 | 38.6 | 40.5 | 40.5 |
| $TiO_2$ | 51.3 | 43.6 | 48.6 | 48.0 | 47.3 | 56.0 | 48.5 | 48.5 | 47.4 | 45.4 | 42.5 | 43.9 | 41.4 |
| MgO | 5.49 | 4.25 | 3.92 | 2.52 | 5.71 | 9.3 | 3.98 | 3.98 | 4.33 | 4.46 | 4.45 | 3.01 | 2.06 |
| $SiO_2$ | 0.51 | 4.61 | 5.23 | 0.88 | 4.63 | | 4.81 | 4.81 | 5.88 | 8.0 | 10.8 | 3.93 | 7.83 |
| CaO | 0.06 | 0.25 | 0.21 | 0.06 | 0.22 | | 0.17 | 0.17 | 0.09 | 0.12 | 0.20 | 0.31 | 3.33 |
| BaO | | | | | | | | | | | | 3.39 | |
| $Na_2O$ | 0.08 | 0.13 | 0.12 | 0.06 | 0.11 | | 0.15 | 0.15 | 0.13 | 0.12 | 0.10 | 0.09 | |
| $K_2O$ | | 0.38 | 0.57 | | 0.38 | | 0.47 | 0.47 | 0.01 | 0.01 | 0.01 | | |
| $Fe_2O_3$ | 0.56 | 0.56 | 0.91 | 0.41 | 0.47 | | 0.55 | 0.55 | 0.51 | 0.51 | 0.41 | 0.46 | |
| $ZrO_2$ | 4.9 | 4.55 | 2.97 | 1.94 | 4 | 5.7 | 0.85 | 0.85 | 2.25 | 2.28 | 2.03 | 4.46 | 4.87 |
| a | 30.8 | 37.3 | 33.5 | 40.0 | 32.2 | 22.5 | 35.8 | 35.8 | 35.0 | 35.5 | 36.5 | 37.6 | 39.5 |
| t | 54.3 | 49.8 | 55.4 | 53.1 | 52.4 | 55.6 | 54.7 | 54.7 | 53.7 | 52.6 | 51.3 | 52.4 | 51.5 |
| m | 11.5 | 9.6 | 8.9 | 5.5 | 12.5 | 18.3 | 8.9 | 8.9 | 9.7 | 10.2 | 10.6 | 7.1 | 5.1 |
| zr | 3.4 | 3.4 | 2.2 | 1.4 | 2.9 | 3.7 | 0.6 | 0.6 | 1.7 | 1.7 | 1.6 | 3.5 | 3.9 |
| 2a + 3m | 96.1 | 103.4 | 93.6 | 96.5 | 102.0 | 99.8 | 98.2 | 98.2 | 99.1 | 101.7 | 104.9 | 96.5 | 94.3 |
| 100 + a | 130.8 | 137.3 | 133.5 | 140.0 | 132.2 | 122.5 | 135.8 | 135.8 | 135.0 | 135.5 | 136.5 | 137.5 | 139.5 |

TABLE 1-continued

| Example | | 1 | 2 | 3 | 4 | 5 | 6 | 7 | 8 | 9 | 10 | 11 | 12 | 13 |
|---|---|---|---|---|---|---|---|---|---|---|---|---|---|---|
| 3t | | 163.0 | 149.3 | 166.3 | 159.4 | 157.2 | 166.7 | 164.1 | 164.1 | 161.0 | 157.7 | 153.9 | 157.2 | 154.4 |
| 210 − a | | 179.2 | 172.7 | 176.5 | 170.0 | 177.8 | 187.5 | 174.2 | 174.2 | 175.0 | 174.5 | 173.5 | 172.4 | 170.4 |
| Phase | AMTZ | M | M | M | M | M | M | M | M | M | M | M | M | M |
| | P2 | ~ | ~ | ~ | ~ | ~ | ~ | ~ | ~ | ~ | ~ | ~ | ~ | ~ |
| | Other phase | No | No | No | No | No | No | No | No | No | No | No | No | No |
| | PS | No | Yes | No | No | Yes | No | Yes | Yes | Yes | Yes | Yes | Yes | Yes |
| Stability | 100 Hours | Yes | Yes | Yes | Yes | Yes | | Yes | Yes | Yes | | | Yes | Yes |
| | $TiO_2$/AMTZ peak ratio | <10 | <20 | <20 | <20 | <20 | | <10 | <10 | | | | <20 | <20 |
| Sintering temperature at 4 h (° C.) | | 1600 | 1450 | 1450 | 1450 | 1450 | | 1300 | 1450 | 1450 | 1450 | 1450 | 1450 | 1400 |
| TEC ($10^{-6}$/° C.) | | 0.8 | 1.1 | | 1.6 | 1.5 | 2.4 | 0.06 | 1.5 | 1.81 | 1.86 | 1.97 | 3.2 | 2.8 |
| MOR (MPa) | | | 13.2 | 15.1 | | 12.6 | | 21.4 | 14.8 | 14.8 | 16.6 | 20.9 | | |

On the basis of the data of Table 1, it may be seen that the ceramic materials are characterized by a stability and a TEC that are compatible with an application as a particulate filter. In particular, they have good mechanical strength.

Furthermore, a ceramic material was synthesized and analyzed, substantially satisfying the composition of Example 2 but obtained this time from an initial blend comprising:

90% by weight of electric-furnace-fused-cast particles described above; and

10% by equivalent weight of oxide, in the final composition, of the raw materials described above.

The initial blend of particles and reactants was sintered at 1450° C. using conventional techniques. The density of the material obtained was 2.8 and its TEC was close to 1.8.

The composition of each phase was then analyzed by microprobe analysis, the results of the analysis being given in Table 2. On the basis of these results, the content by weight of each phase and the values of x, y and z in the general formula $(Al_2TiO_5)_x(MgTi_2O_5)_y(MgTiZrO_5)_z$ of the main phase AMTZ were able to be estimated by calculation.

TABLE 2

| | Example | | | | | | | | | | | | |
|---|---|---|---|---|---|---|---|---|---|---|---|---|---|
| | 2 | | | 8 | | | 10 | | | 11 | | | |
| | AMTZ | PS | P2 | AMTZ | PS | P2 | AMTZ | PS | P2 | AMTZ | PS | P2 | |
| $Al_2O_3$ | 45.9 | 26 | 0.4 | 45 | 21 | 1.4 | 49.4 | 20.7 | 8.1 | 49.5 | 20.8 | 0.9 | |
| $TiO_2$ | 47.6 | 2.8 | 10 | 50.1 | 4.9 | 91.7 | 47.5 | 3.6 | 42 | 47 | 4.8 | 89.7 | |
| MgO | 3.52 | 10.2 | 0.07 | 3.9 | 4.2 | 0.1 | 2.1 | 11.6 | 1.4 | 2.3 | 11.4 | 0.1 | |
| $SiO_2$ | 0.22 | 51.3 | 0.13 | 0.2 | 60.4 | 0.6 | 0.3 | 60.2 | 1.4 | 0.5 | 59.4 | 0.4 | |
| $ZrO_2$ | 2.17 | 1.57 | 89.2 | 0.4 | 1.4 | 6 | 0.4 | 2.4 | 46.8 | 0.4 | 2.8 | 8.5 | |
| CaO | | 2.47 | | | 2.2 | 0.1 | | 0.6 | | | 0.3 | | |
| $Na_2O$ | | 1.05 | | | 0.9 | | | 1.1 | 0.1 | | 0.5 | | |
| $K_2O$ | | 4.32 | | | 5.2 | 0.1 | | 0.1 | | | | | |
| $Fe_2O_3$ | 0.53 | 0.14 | | 0.5 | | 0.2 | 0.2 | 0.1 | 0.1 | 0.2 | 0.2 | 0.2 | |
| x, estimated (×100) | 84 | — | — | 82 | — | — | 89.5 | — | — | 89.8 | — | — | |
| y, estimated (×100) | 12 | — | — | 17 | — | — | 9.8 | — | — | 9.2 | — | — | |
| z, estimated (×100) | 4 | — | — | 1 | — | — | 0.7 | — | — | 1.1 | — | — | |
| Estimated % content | 89 | 8 | 3 | 86 | 9 | 5 | 73 | 14 | 13 | 71 | 19 | 10 | |

| | Example | | | | | | | |
|---|---|---|---|---|---|---|---|---|
| | 5 | | | 1 | | 9 | | |
| | AMTZ | PS | P2 | AMTZ | P2 | AMTZ | PS | P2 |
| $Al_2O_3$ | 43.1 | 23.8 | 0.8 | 39.5 | 0.9 | 48 | 20.9 | 0.9 |
| $TiO_2$ | 49.9 | 3.1 | 36.8 | 51.4 | 38.4 | 47.7 | 3.2 | 87.9 |
| MgO | 4.5 | 8.1 | 0.1 | 5.9 | 0.1 | 2.8 | 11.4 | 0.1 |
| $SiO_2$ | 0.2 | 55.1 | | | 0.8 | 0.3 | 60.7 | 0.1 |
| $ZrO_2$ | 1.7 | 1.3 | 62.2 | 2.6 | 59.9 | 0.7 | 2.2 | 10.9 |
| CaO | | 2.8 | | | | | 0.7 | |
| $Na_2O$ | | 1.3 | | | | | 0.9 | |
| $K_2O$ | | 4.8 | | | | | 0.1 | |
| $Fe_2O_3$ | 0.5 | 0.1 | 0.1 | 0.7 | 0.1 | 0.4 | 0.1 | 0.2 |
| x, estimated (×100) | 79.4 | — | — | 73.3 | — | 87.4 | — | — |

TABLE 2-continued

| | | | | | | | | |
|---|---|---|---|---|---|---|---|---|
| y, estimated (×100) | 17.6 | — | — | 22.2 | — | 11.1 | — | — |
| z, estimated (×100) | 3 | — | — | 4.5 | — | 1.5 | — | — |
| Estimated % content | 87 | 7 | 6 | 94 | 6 | 78 | 10 | 12 |

Comparative specimens, not according to the invention, were also synthesized and analyzed using the same methods as described above with, however, the following multiplications:

according to a first example, Comparative Example 1, the material was initially prepared from fused-cast particles without introducing a source of zirconium into the initial reactants;
 according to a second example, Comparative Example 2, the material was synthesized from particles obtained by reactive sintering of the powders of the raw materials described above, without introducing a source of zirconium into the initial reactants;
 according to a third example, Comparative Example 3, the material was synthesized using too small an amount of titanium in the initial blend, such that $3t<100+a$ and $2a+3m>110$;
 according to a fourth and fifth example, Comparative Examples 4 and 5, the material was initially prepared from fused-cast particles containing a small amount of aluminum;
 according to a sixth example, Comparative Example 6, the material was synthesized from fused-cast particles characterized by a high zirconium content; and
 according to a seventh example, Comparative Example 7, the fused-cast particles were synthesized using an amount of $Al_2O_3$ and an amount of $TiO_2$ such that $3t<100+a$.

The compositions and the results obtained for these comparative examples are given in Table 3.

The data given in Table 3 shows that the materials not according to the invention are not compatible with its use in a porous structure:

the materials of Comparative Examples 1, 2, 4 and 5 have TEC values that are much too high, sometimes even greater than those of SiC;
 the materials of Comparative Examples 3 and 7 not according to the invention are manifestly of insufficient stability; and
 the material of Comparative Example 6 is unacceptable for use in a filtering structure of the particulate filter type. This is because it has a TEC curve in which a break similar to that characterizing the anomalous expansion of zirconium was observed. Thus, before said break, an average TEC of 0.73 was measured, while after before said break, an average TEC of 4.99 was measured. Such a characteristic is liable to create fractures embrittling the material.

Furthermore, the corrosion resistance properties of the materials were determined for Example 8 according to the invention and for Comparative Example 2. More precisely, 0.2 grams of $K_2SO_4$ powder were uniformly deposited on the surface of the disk. The specimen thus covered was then heated at 1300° C. in air for 5 hours. After cooling, the specimen was cut along a radial cut line and prepared for observation in SEM (scanning electron microscope) section. The depth E of the specimen starting from the initial surface of the disk, affected by corrosion was then determined visu-

TABLE 3

| Example | | Comp 1 | Comp 2 | Comp 3 | Comp 4 | Comp 5 | Comp 6 | Comp 7 |
|---|---|---|---|---|---|---|---|---|
| $Al_2O_3$ | | 40.0 | 40.0 | 53.1 | 0.42 | 26.2 | 40.7 | 53.7 |
| $TiO_2$ | | 49.1 | 49.1 | 39.4 | 65.3 | 62.4 | 42.9 | 42.8 |
| MgO | | 4.17 | 4.17 | 2.89 | 19.1 | 9.32 | 4.06 | 2.06 |
| $SiO_2$ | | 5.08 | 5.08 | 0.98 | 0.59 | 0.29 | 4.01 | 0.33 |
| CaO | | 0.22 | 0.22 | 0.05 | 0.15 | 0.11 | 0.25 | 0 |
| $Na_2O$ | | 0.12 | 0.12 | 0.09 | 0.03 | 0.09 | 0.13 | 0.09 |
| $K_2O$ | | 0.64 | 0.64 | 0 | 0.01 | 0.16 | 0.3 | 0.01 |
| $Fe_2O_3$ | | 0.64 | 0.64 | 0.44 | 0.70 | 0.08 | 0.47 | 0.41 |
| $ZrO_2$ | | 0.03 | 0.03 | 2.95 | 13.7 | 1.41 | 7.18 | 0.56 |
| a | | 35.3 | 35.3 | 46.9 | 0.3 | 20.1 | 36.4 | 47.1 |
| t | | 55.3 | 55.3 | 44.5 | 58.1 | 61.0 | 49.0 | 47.9 |
| m | | 9.3 | 9.3 | 6.5 | 33.7 | 18.1 | 9.2 | 4.6 |
| zr | | 0.0 | 0.0 | 2.2 | 7.9 | 0.9 | 5.3 | 0.6 |
| 2a + 3m | | 98.6 | 98.6 | 113.2 | 101.6 | 94.3 | 100.5 | 108 |
| 100 + a | | 135.3 | 135.3 | 146.9 | 100.3 | 120.1 | 136.4 | 147.1 |
| 3t | | 166.0 | 166.0 | 133.4 | 174.4 | 183.0 | 147.1 | 143.7 |
| 210 − a | | 174.7 | 174.7 | 163.1 | 209.7 | 189.9 | 173.6 | 162.9 |
| Phase | AMTZ | M | M | M | M | M | M | |
| | P2 | ~ | ~ | ~ | ~ | ~ | ~ | |
| | Other | No | No | No | No | No | No | |
| | PS | Yes | Yes | No | Yes | No | Yes | |
| Stability | 100 Hours | Yes | Yes | No | | Yes | Yes | No |
| | $TiO_2$/AMTZ peak ratio | <10 | <10 | >200 | | <30 | <20 | >100 |
| Sintering temperature at 4 h (° C.) | | 1450 | 1450 | 1450 | 1500 | 1450 | 1450 | |
| TEC ($10^{-6}$/° C.) | | 4.1 | 3.9 | 1.6 | 7.5 | 4 | Anom. expan. | | ally on the SEM micrographs. The depth E affected by erosion is 60 microns in the case of the specimen according to the invention (Example 8) and 150 microns in the case of the comparative specimen (Comparative Example 2).

The same corrosion resistance tests, carried out on a specimen accordion to the above Example 2 according to the invention, but with $K_2SO_4$ replaced by $Na_2CO_3$, show that the specimen was not eroded after 5 hours (E=0). The same test, carried out on a specimen having the same composition but obtained directly by reactive sintering of the initial reactants (without passing via an intermediate melting step for obtaining fused-cast particles), gave, in contrast, an erosion depth E=160 microns.

Application Example

Properties of the Material for a Specific Use as a Particulate Filter

To study the characteristics of parts formed from the material obtained according to the invention, in particular for an application as a particulate filter, porous specimens were prepared according to the invention from the same powders used previously for producing specimens 2 and 5, the chemical composition of which is given in Table 4.

The performance of the specimens obtained according to Examples 2 and 5 were compared with a new porous specimen not according to the invention (new Comparative Example 8). The porous material was synthesized according to this Comparative Example 8, from particles obtained by reactive sintering of the powders of the raw materials without introducing a source of zirconium into the initial reactants.

As described previously in the description, a porous ceramic material was obtained in the following manner: the powders were blended with 5% of an organic binder of the methyl cellulose type and 8% of a pore-forming agent relative to the total weight of the powder blend. Water was added, mixing until a homogenous paste was obtained that had a plasticity enabling a specimen in the form of a bar measuring 6 mm×8 mm×60 mm to be extruded, which bar was then sintered at 1450° C. or 1400° for 4 hours, as indicated in Table 4.

The thermal expansion coefficient, the modulus of rupture and the porosity characteristics were measured in these specimens so as to estimate the value of the material used in a "particulate filter" application. These porosity characteristics were measured by the well-known techniques of high-pressure mercury porosimetry using a Micromeritics 9500 porosimeter.

The shrinkage on sintering expresses the dimensional change of the specimen after sintering at 1450° C. or 1400° C. depending on the examples. More precisely, according to the invention, the term "shrinkage on sintering" is understood to mean the average reduction along each of the two dimensions of the cross section of the material, persistent at low temperature, i.e. at a temperature below 400° C. and especially at room temperature. In Table 4, the value of the shrinkage indicated corresponds to the average of the shrinkage for the two dimensions, expressed as a percentage of the initial dimension of the bar before sintering, for each of said dimensions. This characteristic is extremely important for assessing the feasibility of the process for manufacturing the porous structure. Specifically, a high shrinkage on sintering means that the honeycomb formed from the material would be subject to major difficulties in industrial scale-up, especially for obtaining, with acceptable reproducibility, structures having dimensional characteristics that can be guaranteed with sufficient precision so as to enable them to be used without any difficulty in particular in an automobile exhaust line.

The modulus of rupture (MOR) was determined at room temperature in three-point bending on the porous bars measuring 60 mm×6 mm×8 mm obtained previously.

All the results obtained are given in Table 4.

TABLE 4

|  | Example | | | | |
|---|---|---|---|---|---|
|  | 2 (inv.) | | 5 (inv.) | | Comp. 8 |
| $Al_2O_3$ | 41.7 | | 37.1 | | 44.9 |
| $TiO_2$ | 43.6 | | 47.3 | | 44.7 |
| MgO | 4.25 | | 5.71 | | 3.55 |
| $SiO_2$ | 4.61 | | 4.63 | | 6.49 |
| CaO | 0.25 | | 0.22 | | 0.03 |
| $Na_2O$ | 0.13 | | 0.11 | | 0.15 |
| $K_2O$ | 0.38 | | 0.38 | | 0.08 |
| $Fe_2O_3$ | 0.56 | | 0.47 | | 0.05 |
| $ZrO_2$ | 4.55 | | 4 | | <0.1 |
| Sintering temp. at 4 h (° C.) | 1400° C. | 1450° C. | 1400° C. | 1450° C. | 1450° C. |
| MOR (MPa) | 7.6 | 7.4 | 5.8 | 7.2 | 7.3 |
| Porosity (%) | 42.6 | 35.9 | 42.1 | 36.3 | 30.3 |
| Pore $d_{50}$ (microns) | 12.4 | 16.4 | 12.2 | 16.8 | 8.6 |
| Sintering shrinkage (%) | 12 | 13.9 | 11.5 | 12.8 | 14.8 |
| TEC ($10^{-6}$/° C.) | 0.87 | 0.27 | 1.24 | 0.44 | 0.79 |

The results given in Table 4 show that the specimens or porous materials according to the invention make it possible to obtain products having overall characteristics that are substantially better than those of conventionally obtained products.

In particular, by comparing the data in Table 4, it may be seen that there is a significant improvement in the combined porosity and mechanical strength characteristics for the manufacture of monoliths: for the same sintering temperature, the table shows that the strength MOR of the porous bars of Examples 2 and 5 according to the invention is comparable to that of Comparative Example 8, while the constituent material of the bars according to these two examples has a porosity more than 20% higher and a pore diameter more than 75% larger than those of the conventional material according to Comparative Example 8.

The invention claimed is:

1. A porous structure, comprising:
a ceramic material comprising a pseudobrookite oxide phase comprising titanium, aluminum, magnesium, and zirconium in proportions such that the pseudobrookite oxide phase is represented by a formula:

$$(Al_2TiO_5)_x(MgTi_2O_5)_y(MgTiZrO_5)_z,$$

said material comprising, in mol % based only on oxides $Al_2O_3$, $TiO_2$, MgO, and $ZrO_2$:

$$90<2a+3m<110;$$

$$100+a<3t<210-a;$$

and

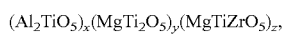

$$a+t+m+zr=100,$$

wherein:
a is a molar content of $Al_2O_3$;
t is a molar content of $TiO_2$;
m is a molar content of MgO; and
zr is a molar content of $ZrO_2$;
x is between 0.45 and 0.94;
y is between 0.05 and 0.50;
z is between 0.005 and 0.06; and $$x+y+z=1.$$

2. The porous structure of claim 1, wherein:
x is between 0.65 and 0.90;
y is between 0.09 and 0.40;
z is between 0.005 and 0.05; and
x+y+z=1.

3. The porous structure of claim 2, wherein at least some of the $ZrO_2$ is replaced with at least one oxide selected from the group consisting of $Ce_2O_3$ and $HfO_2$, based on replacing a molar content of elemental Zr with elemental Ce and/or elemental Hf.

4. The porous structure of claim 1, wherein said ceramic material comprises, in wt % based on oxides:
more than 25% but less than 55% $Al_2O_3$;
more than 35% but less than 60% $TiO_2$;
more than 1% but less than 8% MgO;
more than 0.7% but less than 7% $ZrO_2$; and
less than 20% $SiO_2$.

5. The porous structure of claim 4, wherein said ceramic material comprises, in wt % based on oxides:
more than 35% but less than 50% $Al_2O_3$;
more than 40% but less than 55% $TiO_2$;
more than 1.5% but less than 6% MgO;
more than 1.5% but less than 6% $ZrO_2$; and
more than 0.5% but less than 10% $SiO_2$.

6. The porous structure of claim 4, wherein at least some of the $ZrO_2$ is replaced with at least one oxide selected from the group consisting of $Ce_2O_3$ and $HfO_2$, based on replacing a molar content of elemental Zr with elemental Ce and/or elemental Hf.

7. The porous structure of claim 1, wherein at least some of the $ZrO_2$ is replaced with at least one oxide selected from the group consisting of $Ce_2O_3$ and $HfO_2$, based on replacing a molar content of elemental Zr with elemental Ce and/or elemental Hf.

8. The porous structure of claim 7, wherein at least some of the $ZrO_2$ is replaced with at least one oxide selected from the group consisting of $Ce_2O_3$ and $HfO_2$, based on replacing a molar content of elemental Zr with elemental Ce and/or elemental Hf.

9. The porous structure of claim 1, wherein said ceramic material comprises:
a main phase consisting of the pseudobrookite oxide phase; and
at least one secondary phase, which is a silicate phase comprising silicate; and/or
a phase comprising titanium oxide $TiO_2$ and/or zirconium oxide $ZrO_2$.

10. The porous structure of claim 9, wherein secondary phase consists of a silicate phase a proportion ranging from 0 to 40% of a total weight of the ceramic material.

11. The porous structure of claim 10, wherein said silicate phase is present and comprises silica and alumina, and
a proportion by weight of silica in the silicate phase is greater than 50%.

12. The porous structure of claim 10, wherein said silicate phase is present and comprises silica and alumina, and
a proportion by weight of silica in the silicate phase is greater than 60%.

13. The porous structure of claim 9, wherein a secondary phase comprises titanium oxide $TiO_2$ and/or zirconium oxide $ZrO_2$ in an amount of 80% or more.

14. The porous structure of claim 9, wherein a secondary phase comprises titanium oxide $TiO_2$ and/or zirconium oxide $ZrO_2$ in an amount of 90% or more.

15. The porous structure of claim 1, having a honeycomb structure, wherein the ceramic material constituting said structure has a porosity of greater than 10% and a pore size centered between 5 and 60 microns.

16. The porous structure of claim 1, wherein at least some of the $ZrO_2$ is replaced with at least one oxide selected from the group consisting of $Ce_2O_3$ and $HfO_2$, based on replacing a molar content of elemental Zr with elemental Ce and/or elemental Hf.

17. The porous structure of claim 1, wherein the pseudobrookite oxide phase is at least 60 wt % of a total weight of the ceramic material.

18. A catalyst support or automobile filter, comprising the porous structure of claim 1.

19. A porous structure, comprising:
a ceramic material consisting of a pseudobrookite oxide phase comprising titanium, aluminum, magnesium, and zirconium in proportions such that the pseudobrookite oxide phase is represented by a formula:

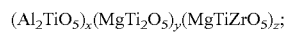
$(Al_2TiO_5)_x(MgTi_2O_5)_y(MgTiZrO_5)_z;$ said material comprising, in mol % based only on oxides $Al_2O_3$, $TiO_2$, MgO, and $ZrO_2$:

$$90<2a+3m<110;$$

$$100+a<3t<210-a;$$

and $$a+t+m+zr=100,$$

wherein:
a is a molar content of $Al_2O_3$;
t is a molar content of $TiO_2$;
m is a molar content of MgO; and
zr is a molar content of $ZrO_2$,
x is between 0.45 and 0.94;
y is between 0.05 and 0.50;
z is between 0.005 and 0.06; and $$x+y+z=1.$$

* * * * *